(12) United States Patent
Saha et al.

(10) Patent No.: US 7,939,050 B2
(45) Date of Patent: May 10, 2011

(54) COMPOSITE ARTICLE AND RELATED METHOD

(75) Inventors: Atanu Saha, Bangalore (IN); Adyam Srinivasa Mukunda, Bangalore (IN)

(73) Assignee: General Electric Company, Niskayuna, NY (US)

( * ) Notice: Subject to any disclaimer, the term of this patent is extended or adjusted under 35 U.S.C. 154(b) by 332 days.

(21) Appl. No.: 12/122,924

(22) Filed: May 19, 2008

(65) Prior Publication Data

US 2009/0285733 A1  Nov. 19, 2009

(51) Int. Cl.
    *C01F 7/44* (2006.01)
(52) U.S. Cl. .......................... 423/600; 423/625; 423/629
(58) Field of Classification Search .................. 423/600, 423/625, 628, 629, 630, 631
    See application file for complete search history.

(56) References Cited

U.S. PATENT DOCUMENTS

| 4,339,511 A | | 7/1982 | Morgan | |
| 4,732,741 A | * | 3/1988 | Duncan et al. | 423/119 |
| 4,797,269 A | | 1/1989 | Bauer et al. | |

FOREIGN PATENT DOCUMENTS

| EP | 0046357 A1 | | 2/1982 |
| FR | 2309490 A1 | | 11/1976 |
| GB | 1386244 A | | 3/1975 |
| JP | 09255417 A | * | 9/1997 |
| JP | 10072729 A | * | 3/1998 |

OTHER PUBLICATIONS

Kaliszewski et al., "Alcohol Interaction With Zirconia Powders", J. Am. Ceram. Soc., vol. 73, No. 6, pp. 1504-1509, 1990.
PCT International Search Report dated Aug. 20, 2009.

* cited by examiner

*Primary Examiner* — Stanley Silverman
*Assistant Examiner* — James Fiorito
(74) *Attorney, Agent, or Firm* — Richard S. DeCristofaro

(57) ABSTRACT

A method for making a composite includes combining a strengthening agent and an aluminum compound to form a first solution; precipitating an $Al(OH)_3$ gel from the first solution, wherein strengthening agent particles are dispersed within the gel; washing the $Al(OH)_3$ gel with an alcohol; contacting the $Al(OH)_3$ gel with a salt; drying the $Al(OH)_3$ gel to form a powder; calcining the powder to convert $Al(OH)_3$ to $Al_2O_3$; and sintering the powder to form a composite article comprising beta double prime alumina.

21 Claims, 4 Drawing Sheets

COMPOSITE ARTICLE AND RELATED METHOD

TECHNICAL FIELD

The invention includes embodiments that relate to a composite separator. The invention includes embodiments that relate to a method of making and/or using a separator.

DISCUSSION OF ART

Beta alumina may be used as an ion-conducting separator in an energy storage device. It may be useful to have the beta alumina separator have relatively good sodium ion conductivity, resistance to corrosion, and improved mechanical properties. The processing of beta alumina includes the retention of a beta double prime phase. The beta double prime phase may be desirable if it exhibits a high density and a higher sodium conductivity than other beta phases. Increasing processing temperatures may increase density, but the higher the temperature the more sodium may be lost. A loss of sodium may destabilize the beta double prime phase. Furthermore, densification at higher temperatures may exaggerate grain growth. An exaggerated grain growth may degrade the mechanical properties of the electrolyte.

It may be desirable to have a method of processing a beta double prime alumina-based separator that differs from currently available methods. It may be desirable to have an alumina-based separator that has properties and characteristics that differ from currently available articles.

BRIEF DESCRIPTION

In one embodiment, a method for making a composite includes combining a strengthening agent and an aluminum compound to form a first solution; precipitating an $Al(OH)_3$ gel from the first solution, wherein strengthening agent particles are dispersed within the gel; washing the $Al(OH)_3$ gel with an alcohol; contacting the $Al(OH)_3$ gel with a salt; drying the $Al(OH)_3$ gel to form a powder; calcining the powder to convert $Al(OH)_3$ to $Al_2O_3$; and sintering the powder to form a composite article comprising beta double prime alumina.

DETAILED DESCRIPTION

Figure 1:
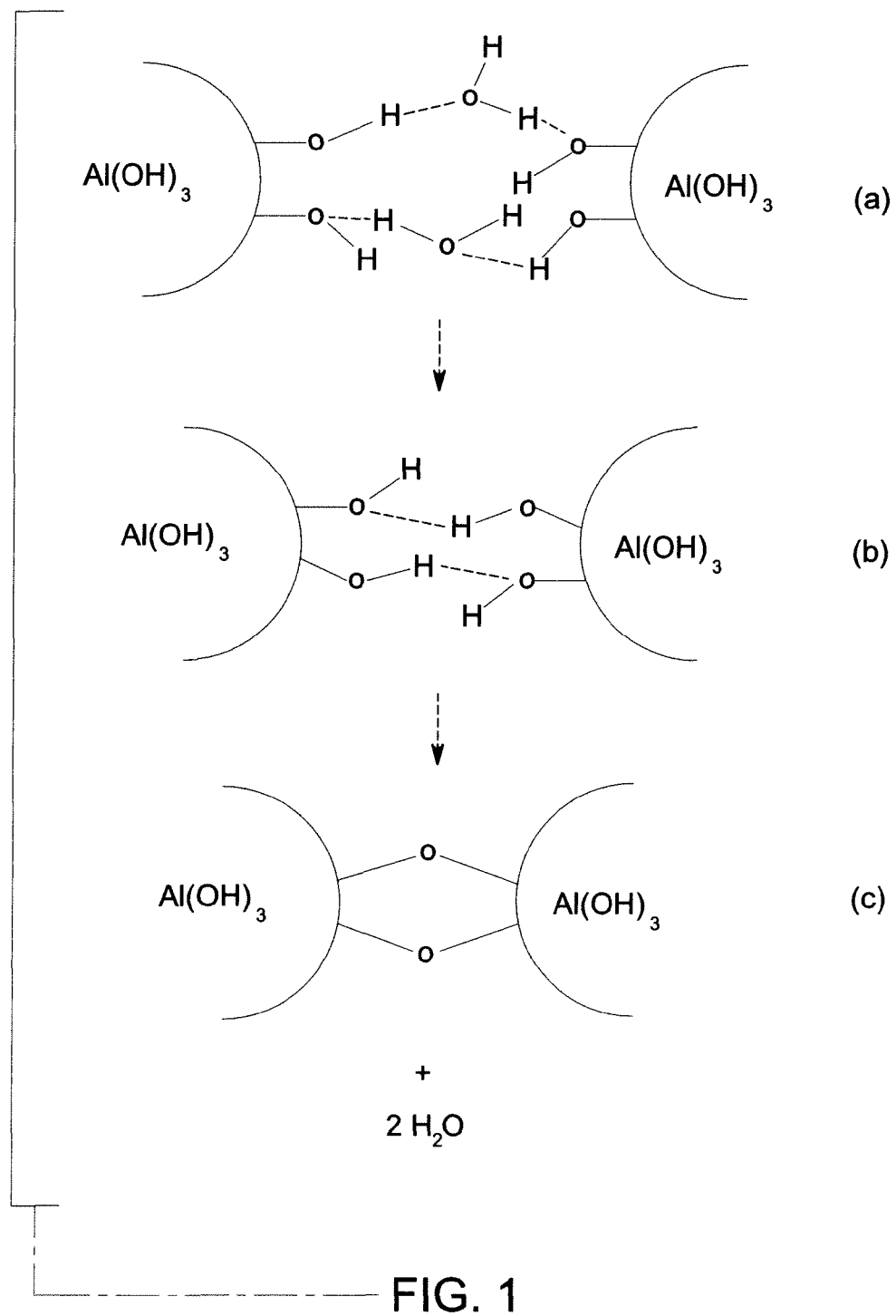
FIGS. 1(a)-1(c) illustrate the formation of chemical bonds between terminal hydroxy groups on the surface of an $Al(OH)_3$ gel when the gel is not washed with an alcohol.

The invention includes embodiments that relate to a composite separator. The invention includes embodiments that relate to a method of making and/or using the separator. Particularly, a separator may be produced that includes a beta double prime alumina based composite. A composite may be sinterable at temperatures low enough to retain the beta double prime phase of alumina within the composite. The separator may have one or more mechanical properties that differ from currently available articles.

As used herein, a separator is an ion-conducting electrically insulative structure. The separator may be made from β"-Alumina (beta prime-prime alumina) which is an isomorphic form of aluminium oxide ($Al_2O_3$) and is a polycrystalline ceramic and which may be complexed with a mobile ion, the ion may be one or more of $Na^+$, $K^+$, $Li^+$, $Ag^+$, $H^+$, $Pb_2^+$, $Sr_2^+$, or $Ba_2^+$ depending on the application requirements. Hydroxyl moieties pendent on a surface of alumina are denoted with $Al(OH)_3$. A gel is a semirigid colloidal dispersion of a solid or semi-solid within a liquid or gas. A sol is a colloidal solution. A slurry is a mixture of a liquid and finely divided particles. A powder is a substance formed as finely dispersed solid particles.

In one embodiment, the method includes combining an aluminum compound with a strengthening agent in a solution. Suitable aluminum compounds may include one or more of aluminum nitrate, aluminium chloride, and organometallic precursors of aluminum. Aluminum precursors may include one or more of aluminum isopropoxide, aluminium-sec-butoxide, and the like.

The strengthening agent may affect the mechanical properties of a composite article formed. Incorporation of the strengthening agent may affect one or more of flexural strength, fracture toughness, damage resistance and hardness both at room temperature and elevated temperatures, as well as thermal shock resistance.

A composite article formed according to an embodiment as disclosed herein may include an amount by volume of beta double prime $Al_2O_3$, that may be greater than about 30 percent. In one embodiment, the composite article includes an amount by volume of beta double prime $Al_2O_3$ that may be in a range of from about 50 percent to about 95 percent. In addition, the beta double prime $Al_2O_3$ particles present in the composite have an average diameter that may be less than about 15 micrometers. In one embodiment, the beta double prime $Al_2O_3$ particles have an average diameter that may be in a range of from about 1 to about 5 micrometers.

Examples of suitable strengthening agents may include one or more metal oxides, metal carbides, metal borides, or metal nitrides. Suitable metal oxide strengthening agents may include zirconium oxide. Suitable metal carbide strengthening agents may include silicon carbide, boron carbide, or titanium carbide. Suitable metal nitride strengthening agents may include silicon nitride aluminum nitride, or boron nitride. Other suitable metal-based strengthening agents may include, for example, cerium zirconate or titanium diboride. In one embodiment, the strengthening agent comprises zirconium oxide. In one embodiment, the strengthening agent consists only of zirconium oxide.

A composite article formed according to an embodiment as disclosed herein may include an amount by volume of the strengthening agent that may be greater than about 5 percent. In one embodiment, the composite includes an amount by volume of the strengthening agent that is in a range of from about 5 percent to about 10 percent, from about 10 percent to about 15 percent, from about 15 percent to about 25 percent, or from about 25 percent to about 35 percent, or greater than about 35 percent by volume.

The strengthening agent particles present in the composite may have an average diameter (across a greatest axis) that is less than about 10 micrometers. In one embodiment, the strengthening agent particles may have an average diameter in a range of from about 10 micrometers to about 5 micrometers, from about 5 micrometers to about 2 micrometers, from about 2 micrometers to about 1 micrometer, from about 1 micrometer to about 0.5 micrometers, from about 0.5 micrometers to about 0.2 micrometers, or less than about 2 micrometers.

The strengthening agent particles present in the composite may be substantially spherical, plate-like, rod-like, or irregularly shaped. In one embodiment, the particles are irregularly shaped having a substantially uniform cross-sectional diameter.

Selection of the solution may be based on factors such as the choice of aluminum compound(s). In one embodiment, the solution may include an organic solvent, while in another embodiment the solution may include an inorganic solvent. An organic/inorganic solvent solution may be used. Examples of suitable organic solvents for use in the invention include, but not limited to alcohols, such as ethyl alcohol, propylalcohol, and isopropyl alcohol. An example of a suitable inorganic solvent includes water. For inorganic aluminum compounds like aluminum nitrate or aluminum chloride, the solvent may be deionized water. In the case of organometallic precursors of aluminum such as aluminum isopropoxide or aluminum-sec-butoxide, the solvent may be an alcohol including. Suitable alcohols may include short chain alcohols having a carbon count of less than about 20 carbons per hydroxyl. Suitable short chain alcohols may include one or more of ethyl alcohol, propylalcohol, or isopropyl alcohol. If the aluminum compound may be aluminum nitrate, the solvent may be de-ionized water. While in case of aluminium-sec-butoxide, the solvent may be isopropyl alcohol. In one embodiment of the invention, the aluminum compound solution may be formed by dissolving $Al(NO_3)_3,9H_2O$ (aluminium nitrate 9-hydrate) in deionized water.

The strengthening agent may be added to the aluminum compound solution, and may form a slurry solution. In one embodiment, the strengthening agent is added to the aluminum compound solution, and dispersed in the solution using an ultrasonic mixer. Depending upon the specific strengthening agent used, the pH of the slurry solution may be acidic. In one embodiment, the pH may be maintained in a range of from about 1 to about 7 to disperse the strengthening agent, and avoid agglomeration of the strengthening agent in the solution. In one embodiment, the pH range is from about 1 to about 2, from about 2 to about 3, from about 3 to about 4, from about 4 to about 5, or from about 5 to about 7. Controlling the pH allows for control over the sintering behavior of the calcined powder and the uniformity of dispersion of the strengthening agent in the final composite.

An $Al(OH)_3$ gel may precipitate out of the slurry solution. In one embodiment, the slurry solution may be added drop wise to a solution of water and ammonia. The solution of water and ammonia may be maintained at a basic pH as the slurry solution may be added to the ammonia and water solution. In one embodiment, the solution of water and ammonia may be basic. The pH may be maintained at a pH in a range of from about 8 to about 14. In one embodiment, the pH may be about in a range of from about 8 to about 9, from about 9 to about 10, from about 10 to about 11, from about 11 to about 12, from about 12 to about 13, or from about 13 to about 14.

A resulting reaction product includes an $Al(OH)_3$ gel that includes strengthening agent particles included therein. The strengthening agent particles may be partially or entirely comprised of the strengthening agent. The strengthening agent particles may be encapsulated in the gel. The strengthening agent particles may be evenly dispersed within the gel. The encapsulation of the strengthening agent particles may reduce or eliminate the interaction of the strengthening agent particles with each other in the gel. In one embodiment, the encapsulation prevents agglomeration of the strengthening agent particles. In addition, the uniform distribution of the strengthening agent particles in the gel may result in a controlled distribution of strengthening agent particles in a resulting composite. The distribution may affect the mechanical properties of the resulting composite.

The strengthening agent particles may be controlled to have a narrow particle size distribution. Alternatively, the strengthening agent particles may be controlled to have a wide particle size distribution. In one embodiment, the particle size distribution may be controlled to be bimodal or multimodal.

The $Al(OH)_3$ gel has an internal surface, and includes terminal hydroxy (OH) groups pendant on the gel surface. Upon heating, these OH groups form Al—O—Al bonds and a byproduct of $H_2O$. This bonding forms a hard agglomeration, as illustrated in FIGS. 1(a)-1(c) and FIG. 2(a).

Figure 2:
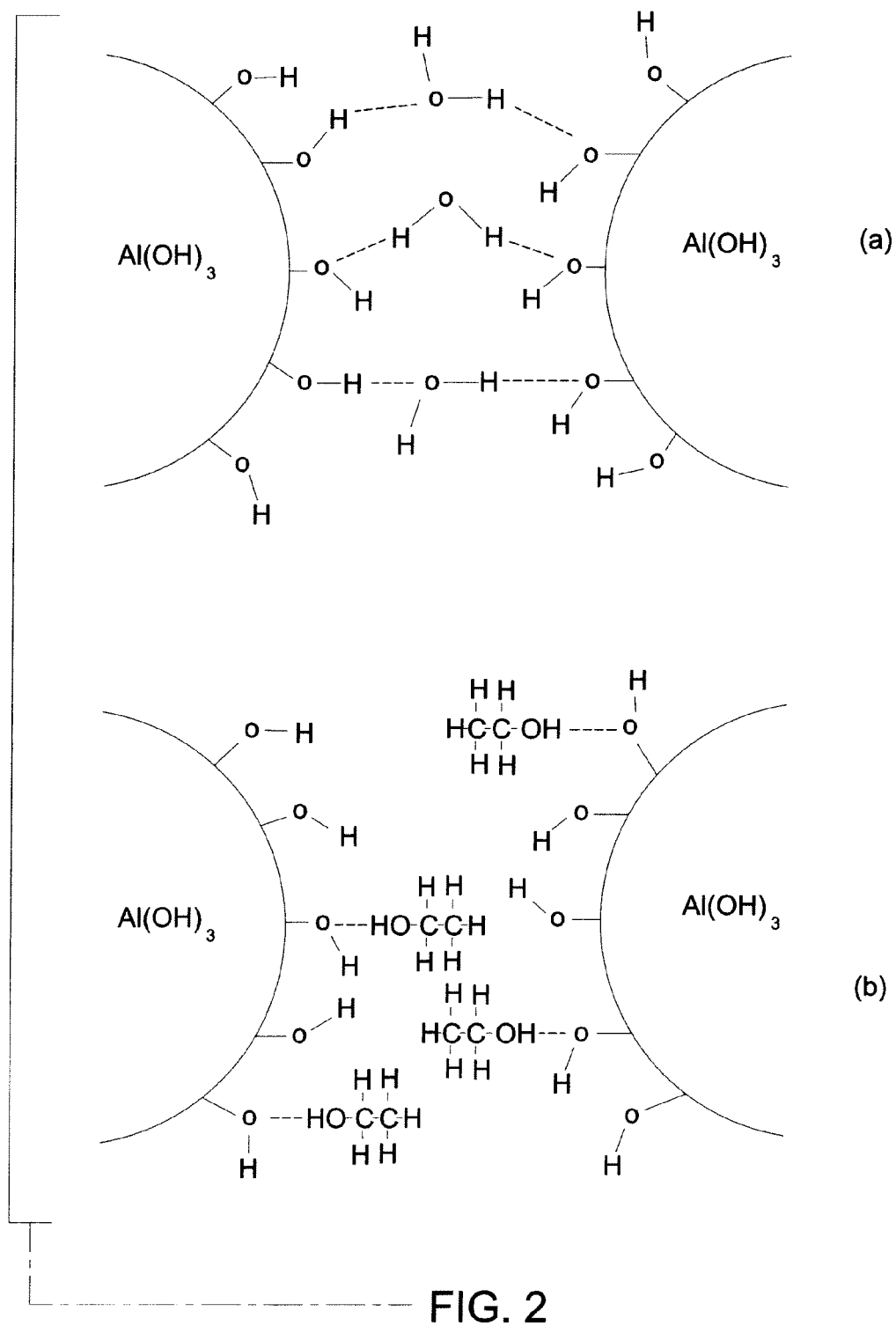
FIGS. 2(a)-2(b) illustrate the replacement of terminal hydroxy groups on the surface of an $Al(OH)_3$ gel with non-terminal ethoxy groups after the gel is washed with an alcohol in accordance with an embodiment of the invention.

In one embodiment, the $Al(OH)_3$ gel may be washed and filtrated with a low molecular weight alcohol. The wash and filter may reduce or eliminate the terminal hydroxy groups on the gel surface. Reduction or elimination of the hydroxy groups may, naturally, reduce or eliminate the Al—O—Al bond formation. The alcohol may react with the terminal hydroxy surface groups, and may replace the OH groups with non-terminal ethoxy or propoxy groups depending on the type of alcohol used for washing. FIGS. 2(a) and 2(b) illustrate the replacement of OH groups by ethoxy groups.

The reduction or prevention of the gel inter-particle interaction may reduce or lower the agglomeration strength of the resulting calcined composite powder. In turn, this may increase the specific surface area of the composite powder. Higher specific surface area powders may be more readily sinterable at relatively lower temperatures than lower specific surface area powders of the same composition. Furthermore, reduction or prevention of the gel inter-particle interaction and agglomeration may control the particle size of alumina in the resulting composite to have an average particle diameter that may be the nano-sized range.

Suitable alcohols for washing the $Al(OH)_3$ gel may include low molecular weight alcohols. Suitable low molecular weigh alcohols may include one or more of methanol, ethanol, propanol, or isopropanol. The $Al(OH)_3$ gel may be washed and filtrated with the alcohol. A suitable process for washing the gel may be by continuously stirring the gel in the alcohol media. Filtration may be performed by any method known to those having skill in the art including, but not limited to centrifuging or passing the gel through filter paper. After the $Al(OH)_3$ gel may be washed with an alcohol, the surface of the gel may be contacted with a salt. Examples of suitable salts may include, but may be not limited to NaOH, LiOH, and the like. Alternatively, a peroxide may be used as the wash. The gel surface may be contacted with a salt, whereby salt ions remain attached to the surface of the gel. For example, the salt of a metal can be added to an alcohol solvent.

Metal salts may dissolve in an organic or inorganic solvent, and either type of solvent may be used in the invention. The $Al(OH)_3$ gel may be combined with the solvent, and then mechanically stirred to distribute the salt uniformly on the gel surface. The mixture may be dried while continuously stirring to reduce or prevent sedimentation that may lead to a non-uniform distribution of salt in the dried gel. Drying under continuous stirring may produce a gelatinous mass by evaporating the alcohol solvent. The gelatinous mass may be dried prior to calcination, as described below. The salt ions remain on the surface of the $Al(OH)_3$ gel and later react with the $Al(OH)_3$ to form beta double prime alumina.

The ion soaked $Al(OH)_3$ gel may be then further dried to form a powder. Any method know to those having skill in the art may be used to further dry the $Al(OH)_3$ gel, including drying in oven with or without circulating air therein. In one embodiment, the $Al(OH)_3$ gel may be dried by heating the gel to a temperature in a range of from about 70 degrees Celsius to about 120 degrees Celsius, from about 120 degrees Celsius to about 200 degrees Celsius, or from about 200 degrees Celsius to about 300 degrees Celsius.

The composite powder may be calcined at a temperature greater than about 300 degrees Celsius. In one embodiment, the calcine temperature is in a range of from about 300 degrees Celsius and about 400 degrees Celsius, from about 400 degrees Celsius to about 600 degrees Celsius, or from about 600 degrees Celsius to about 1000 degrees Celsius. As a result of calcination, the aluminum hydroxide may convert to aluminum oxide. The composite powder may be calcined in a resistive heating furnace.

If desired, a binder may be added to the composite powder. An example of a suitable binder includes polyvinyl alcohol.

The composite powder can be pelletized. For example, the composite powder may be pelletized under uniaxial and/or isostatic pressing. During uniaxial pressing, the pressing may be performed using a steel die. Isostatic pressing may be performed in a rubber die. The resulting pellets may be sintered with or without pressure. During pressureless sintering, a pelletized compact may be kept in a furnace. Pressure assisted sintering may be carried out in a hot press or hot isostatic press.

During the sintering process of the composite powder, beta double prime alumina may form in-situ via reaction of the salt ions with $Al_2O_3$. The composite powder sinter at a temperature greater than about 1400 degrees Celsius. In one embodiment, the sinter temperature may be in a range of from about 1450 degrees Celsius to about 1550 degrees Celsius, or from about 1550 degrees Celsius to about 1650 degrees Celsius. Due to the ability of the composite powder to sinter at relatively lower temperatures, e.g. temperatures below about 1650 degrees Celsius, the composite retains the beta double prime phase of the alumina once formed.

The retention of beta double prime phase depends, at least in part, on the sintering temperature used. The higher the sintering temperature, the greater the possibility of losing Na and Li ions from the composite powder, which destabilizes the beta double prime phase. On the contrary, the higher the sintering temperature, the greater the density. Thus, the sintering temperature may be a competitive processing parameter to achieve both density and stability of the beta double prime phase. The optimal sintering temperature should be low enough to prevent the evaporation of Na and Li ions from the beta double prime phase, yet be high enough to achieve proper densification of the composite article. The methods described herein may address both goals. Moreover, densification at lower temperatures may reduce or prevent exaggerated grain growth, thereby promoting enhanced mechanical properties.

Figure 3:
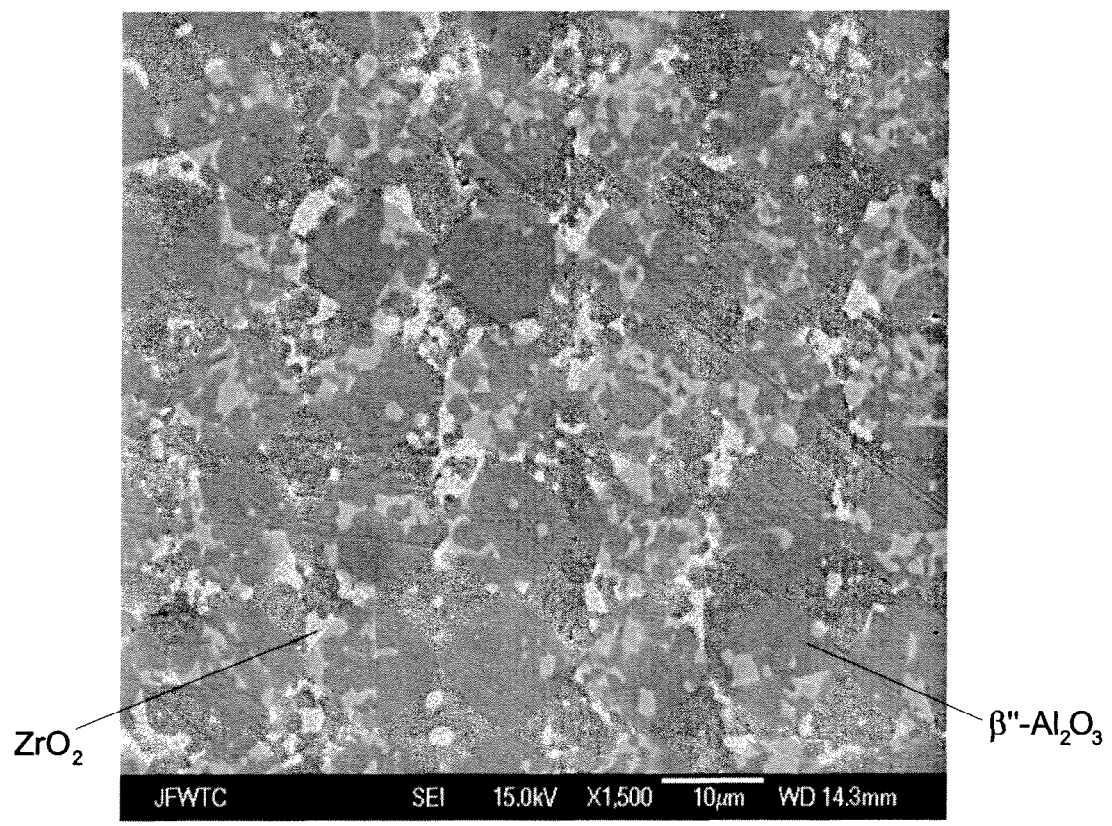
FIG. 3 illustrates the density of a composite formed in accordance with an embodiment of the invention.
Figure 4:
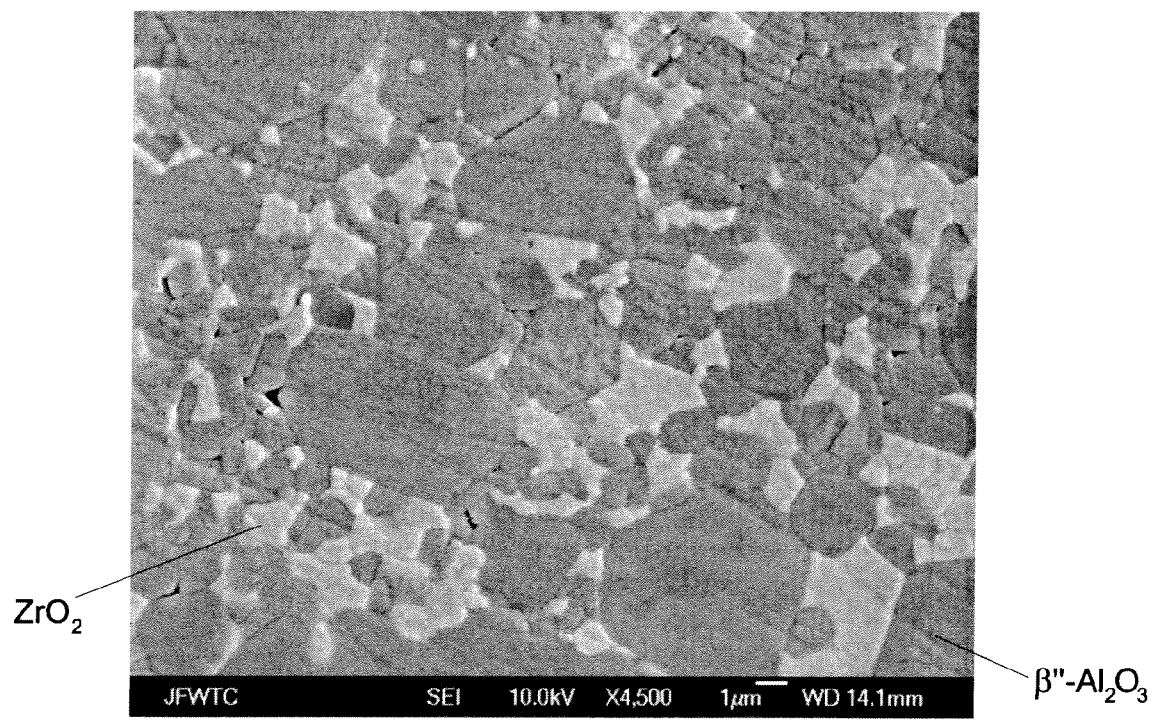
FIG. 4 illustrates the uniform distribution of $ZrO_2$ particles in a composite formed in accordance with an embodiment of the invention.

Referring to FIGS. 3 and 4, controlling parameters and properties of the methods disclosed herein may result in a composite article having different densities and distributions of strengthening agent particles within the composite article. FIG. 3 illustrates a densified composite of zirconium oxide in a double prime beta alumina, and FIG. 4 shows the uniform distribution of zirconium oxide particles in beta double prime alumina. In one embodiment, a composite article may have a density that is greater than 70 percent of theoretical density. In one embodiment, the composite article may have, in addition to a suitable degree of beta double prime phase, a density that is in a range of from about 70 percent to about 80 percent, from about 80 percent to about 90 percent, or from about 90 percent to about 99 percent of theoretical density.

A composite article may be in the form of an ion-conductive electrically insulative separator suitable for use in high temperature electrochemical cells. Such cells may be useful in the power utility and/or transportation industry.

EXAMPLES

The following examples illustrate methods and embodiments in accordance with the invention, and as such should not be construed as imposing limitations upon the claims. Unless specified otherwise, all components are commercially available from common chemical suppliers such as Alpha Aesar, Inc. (Ward Hill, Mass.), Spectrum Chemical Mfg. Corp. (Gardena, Calif.), and the like.

Example 1

Preparation of Beta Double Prime Alumina Based Composite Article

An amount of $Al(NO_3)_3,9H_2O$ is dissolved in deionized water to form a first solution. An amount of $ZrO_2$ is added to the solution and dispersed in the solution via an ultrasonic mixer to form a slurry. The pH of the slurry is maintained between 2 and 3 to obtain dispersion and avoid agglomeration of the $ZrO_2$.

The slurry is added drop wise to a solution of ammonia and water, which results in the precipitation of an $Al(OH)_3$ gel. The pH of the ammonia and water solution is maintained between 10.5 and 11 while the slurry is added to the solution. A change in pH of the ammonia and water solution due to the addition of the slurry is compensated for by also adding $NH_4OH$ continuously to the solution. The $Al(OH)_3$ gel includes $ZrO_2$ particles encapsulated therein. The ammonia and water solution is decanted from the $Al(OH)_3$ gel, and the gel is washed with de-ionized water to remove any residual ammonia.

The $Al(OH)_3$ gel is washed and filtrated with isopropyl alcohol, to remove the terminal hydroxy groups from the surface of the gel.

A second solution is prepared by adding NaOH and LiOH to an alcohol. The second solution is mixed with the $Al(OH)_3$ gel to form a salt gel. The $Al(OH)_3$ salt gel is dried on a hot plate with continuous stirring to form a gelatinous mass. The gelatinous mass is further dried in an oven at a temperature in a range between 100 and 120 degrees Celsius. The dried gel is crushed with a mortar and pestle, and calcined at a temperature between 400 and 500 degrees Celsius for 5 hours in air. The calcination of the dried gel forms a powder containing $ZrO_2$ strengthening agent particles which are encapsulated with highly sinterable $Al_2O_3$.

Polyvinyl alcohol (PVA) is added to the calcined powder in a concentration of 1 weight percent based on the total weight of the calcined powder. The calcined powder is pelletized in a steel die, and the resulting pellets are sintered at 1525 degrees Celsius for 5 hours in air. The resulting sintered composite article has a density that approaches theoretical density, and maintains a beta double prime phase of alumina.

All ranges disclosed herein are inclusive of the endpoints, and the endpoints are combinable with each other. The terms "first," "second," and the like as used herein do not denote any order, quantity, or importance, but rather are used to distinguish one element from another. The modifiers "about" and "about" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

What is claimed is:

1. A method for making a composite, comprising:
    combining a strengthening agent and an aluminum compound to form a first solution;
    precipitating an $Al(OH)_3$ gel from the first solution by:
        providing a second solution comprising ammonia and water; and
        adding the first solution to the second solution while maintaining the pH of the second solution in a range of from about 8 to about 14,
        wherein strengthening agent particles are dispersed within the gel;
    washing the $Al(OH)_3$ gel with an alcohol;
    contacting the $Al(OH)_3$ gel with a salt;
    drying the $Al(OH)_3$ gel to form a powder;
    calcining the powder to convert $Al(OH)_3$ to $Al_2O_3$; and
    sintering the powder to form a composite article comprising beta double prime alumina.

2. The method as defined in claim 1, wherein contacting the $Al(OH)_3$ gel with an alcohol comprises removal of terminal hydroxy groups.

3. The method as defined in claim 1, wherein the alcohol comprises methanol, ethanol, propanol, isopropanol, or a combination of two or more thereof.

4. The method as defined in claim 1, wherein the strengthening agent comprises zirconium oxide, cerium zirconate, silicon carbide, boron carbide, titanium carbide, titanium diboride, silicon nitride, boron nitride or a combination of two or more thereof.

5. The method as defined in claim 4, wherein the strengthening agent comprises $ZrO_2$.

6. The method as defined in claim 1, wherein combining the strengthening agent and the aluminum compound comprises:
    dissolving the aluminum compound in a solvent to form an aluminum compound solution; and
    ultrasonically dispersing the strengthening agent in the aluminum compound solution.

7. The method as defined in claim 1, wherein the aluminum compound comprises aluminum nitrate, aluminium chloride, aluminum isopropoxide or aluminium-sec-butoxide.

8. The method as defined in claim 7, wherein the aluminum compound comprises aluminum nitrate.

9. The method as defined in claim 1, wherein the first solution is a slurry.

10. The method as defined in claim 1, wherein the salt comprises NaOH, LiOH, or a combination of two or more thereof.

11. The method as defined in claim 1, wherein drying the $Al(OH)_3$ gel comprises:
    a first drying step to remove alcohol from the gel; and
    a second drying step to form a powder.

12. The method as defined in claim 1, wherein drying the gel comprises heating the gel to a temperature between about 70 degrees Celsius and about 300 degrees Celsius.

13. The method as defined in claim 1, wherein after drying the gel the method further comprises:
    calcining the powder at a temperature in a range of from about 300 degrees Celsius to about 1000 degrees Celsius.

14. The method as defined in claim 1, wherein the powder is sintered at a temperature in a range of from about 1450 degrees Celsius to about 1650 degrees Celsius.

15. The method as defined in claim 1, wherein the strengthening agent particles are substantially uniformly distributed within the composite.

16. The method as defined in claim 1, wherein the composite has a density in a range of from about 70 percent to about 90 percent of theoretical density.

17. The method as defined in claim 1, wherein the composite has a density in a range of from about 91 percent to about 100 percent of theoretical density.

18. The method as defined in claim 1, wherein the composite comprises beta double prime $Al_2O_3$ particles having an average diameter less than about 15 micrometers.

19. The method as defined in claim 1, wherein the composite comprises strengthening agent particles having an average diameter less than about 10 micrometers.

20. The method as defined in claim 1, wherein the composite comprises from about 10 percent to about 30 percent by volume of the strengthening agent.

21. The method as defined in claim 1, wherein the composite comprises from about 50 percent to about 95 percent by volume of beta double prime $Al_2O_3$.

* * * * *